(12) United States Patent
Liu et al.

(10) Patent No.: US 7,711,842 B2
(45) Date of Patent: May 4, 2010

(54) SYSTEM AND METHOD FOR REMOTE MACHINE DATA TRANSFER

(75) Inventors: Yang Liu, Dunlap, IL (US); Larry James Wilson, East Peoria, IL (US); Donald Franklin Smith, Jr., Washington, IL (US); William Todd Hasty, Manito, IL (US); Todd Philip Cole, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 293 days.

(21) Appl. No.: 11/824,240

(22) Filed: Jun. 29, 2007

(65) Prior Publication Data

US 2009/0006540 A1 Jan. 1, 2009

(51) Int. Cl.
*G06F 13/00* (2006.01)
(52) U.S. Cl. ............... 709/232; 709/228; 709/227; 709/230; 709/224
(58) Field of Classification Search .......... 709/232, 709/228, 227, 224, 230; 714/4, 43
See application file for complete search history.

(56) References Cited

U.S. PATENT DOCUMENTS

| 5,845,067 | A | 12/1998 | Porter et al. |
| 6,088,702 | A | 7/2000 | Plantz et al. |
| 6,675,299 | B2 | 1/2004 | Porter et al. |
| 7,069,592 | B2 | 6/2006 | Porcari |
| 2002/0042846 | A1* | 4/2002 | Bottan et al. ............. 709/249 |
| 2002/0065698 | A1 | 5/2002 | Schick et al. |
| 2002/0165856 | A1 | 11/2002 | Gilfillan et al. |
| 2003/0046134 | A1 | 3/2003 | Frolick et al. |
| 2003/0177422 | A1 | 9/2003 | Tararoukhine et al. |
| 2005/0033774 | A1 | 2/2005 | Brentano et al. |
| 2005/0086298 | A1 | 4/2005 | Campbell et al. |
| 2005/0240467 | A1 | 10/2005 | Eckart et al. |
| 2006/0112145 | A1 | 5/2006 | Rieger et al. |
| 2006/0161554 | A1 | 7/2006 | Lucovsky et al. |
| 2006/0248165 | A1* | 11/2006 | Sridhar et al. ............. 709/218 |
| 2008/0021990 | A1* | 1/2008 | Mansilla ............. 709/223 |
| 2009/0161633 | A1* | 6/2009 | Chen et al. ............. 370/335 |

FOREIGN PATENT DOCUMENTS

EP 1 672 570 A1 6/2006

* cited by examiner

*Primary Examiner*—Kenneth R Coulter
(74) *Attorney, Agent, or Firm*—Finnegan, Henderson, Farabow, Garrett & Dunner

(57) ABSTRACT

A method for data transfer between a client system and a server comprises receiving one or more user-defined file transfer specifications and establishing a communication channel between a client system and a server system based on the file transfer specifications. The method also includes initializing transfer of operation data between the client system and the server system via the communication channel. The method further includes providing an exception notification to one or more user-designated recipients if the transfer of the operation data between the client system and the server system is inconsistent with the file transfer specifications.

21 Claims, 5 Drawing Sheets

SYSTEM AND METHOD FOR REMOTE MACHINE DATA TRANSFER

TECHNICAL FIELD

The present disclosure relates generally to data transfer between remote assets and, more particularly, to systems and methods for transferring large volumes of raw machine data between geographically dispersed computer systems and/or servers.

BACKGROUND

Many of today's commercial and industrial work environments involve machines or other equipment systems that operate in geographical areas that are located remotely from one another and from a job-site command center. In order to monitor the health, productivity, and status of these machines, each machine may be equipped with on-board data collection devices for monitoring various aspects associated with operations of the machine. The machines may also include communication equipment for facilitating data communication between the on-board data collection devices and an off-board system, such as a computer system associated with the job-site command center. The collected data may be analyzed to diagnose health or productivity problems associated with one or more of the equipment systems.

In some work environments, particularly those that employ large numbers of machines, the volume of data received by the job-site may quickly become too cumbersome for the job-site computer system to handle. Many project managers and job-site personnel simply do not have the appropriate training to monitor and analyze the large volume of data received by the job-site computer system. To address these problems, some equipment manufacturers and dealers offer subscriber-based services that receive machine data from a plurality of job-sites in a centralized data monitoring server. The centralized data monitoring server may analyze the data received from computer systems associated with one or more job-sites. The data monitoring server may also provide diagnostic and prognostic reports summarizing the health, status, and productivity of the equipment systems to one or more project managers or business entities associated with the job-site.

Although subscriber-based diagnostic services may provide a cost-effective and reliable solution to job-site data management and reporting, the transfer of large amounts of machine data securely, reliably, and in a timely fashion can be problematic. For example, should one or more communication channels between the job-site computer system and the data monitoring server become interrupted or disabled, the data monitoring server may not receive machine data in time to diagnose and/or resolve problems associated with one or more machines. This may potentially lead to unnecessary equipment downtime and/or losses in job-site productivity. Thus, in order to enhance reliability of data transfer in machine work environments, an integrated machine data file transfer system that monitors file transfers between a sender and intended recipient, identifies potential data transfer problems, and promptly notifies the sender and recipient of any communication problems may be advantageous.

At least one data transfer system has been developed that notifies the sender and recipient of a successful data transfer procedure. For example, U.S. Patent Publication No. 2003/0177422 ("the '422 publication") to Tararoukhine et al. describes a file transfer and data management system that tracks the status of a document or file to be uploaded to a file transfer server. The system of the '422 publication may detect when the file has been uploaded to the file server and automatically provide an email notification of the uploaded file to the intended recipient and the sender of the file. Additionally, the system may provide an e-mail notification to the sender of the file when the intended recipient has downloaded the file from the file server.

Although conventional systems exist that provide e-mail notifications when files have been successfully transferred, they may still be insufficient. For example, conventional systems may not be equipped to monitor data transfer based on user-defined file transfer specifications, detect exceptions to data transfer specifications, and provide exception notifications if the file transfer session was not in conformance with the specifications. Thus, in order to ensure the reliable, efficient, and timely transfer of machine data between a remote job-site and a data monitoring server, an integrated, "real-time" file transfer protocol that provides an exception-based notification system may be required.

The presently disclosed system and method for remote machine data transfer is directed toward overcoming one or more of the problems set forth above.

SUMMARY OF THE INVENTION

In accordance with one aspect, the present disclosure is directed toward a method for data transfer between a client system and a server. The method may include receiving one or more user-defined file transfer specifications and establishing a communication channel between a client system and a server system based on the file transfer specifications. The method may also include initializing transfer of operation data between the client system and the server system via the communication channel. The method may also include providing an exception notification to one or more user-designated recipients if the transfer of the operation data between the client system and the server system is inconsistent with the file transfer specifications.

According to another aspect, the present disclosure is directed toward a system for remote machine data transfer. The system may include a client system associated with one or more machines operating in a work environment, a server system communicatively coupled to the client system and configured to receive operation data associated with the one or more machines from the client system, and a data transfer application for facilitating communication between the client system and the server system. The data transfer application may be configured to receive one or more user-defined file transfer specifications, establish a communication channel between the client system and the server system based on the file transfer specifications, and initialize transfer of operation data between the client system and the server system via the communication channel. The data transfer application may also be configured to provide a notification to one or more user-designated recipients if the transfer of machine data between the client system and the server system is unsuccessful.

In accordance with yet another aspect, the present disclosure is directed toward a work environment comprising a machine including at least one monitoring device communicatively coupled to at least one component of the machine, the monitoring device configured to monitor operation data associated with the machine. The work environment may also include a client system in data communication with the machine and configured to collect operation data from the at least one monitoring device, a server system communicatively coupled to the client system and configured to receive operation data associated with the one or more machines from the client system, and a data transfer application for facilitating communication between the client system and the server system. The data transfer application may be configured to receive one or more user-defined file transfer specifications, establish a communication channel between the client system and the server system based on the file transfer specifications, initialize transfer of operation data between the client system and the server system via the communication channel, and provide a notification to one or more user-designated recipients if the transfer of machine data between the client system and the server system is unsuccessful.

DETAILED DESCRIPTION

Figure 1A:
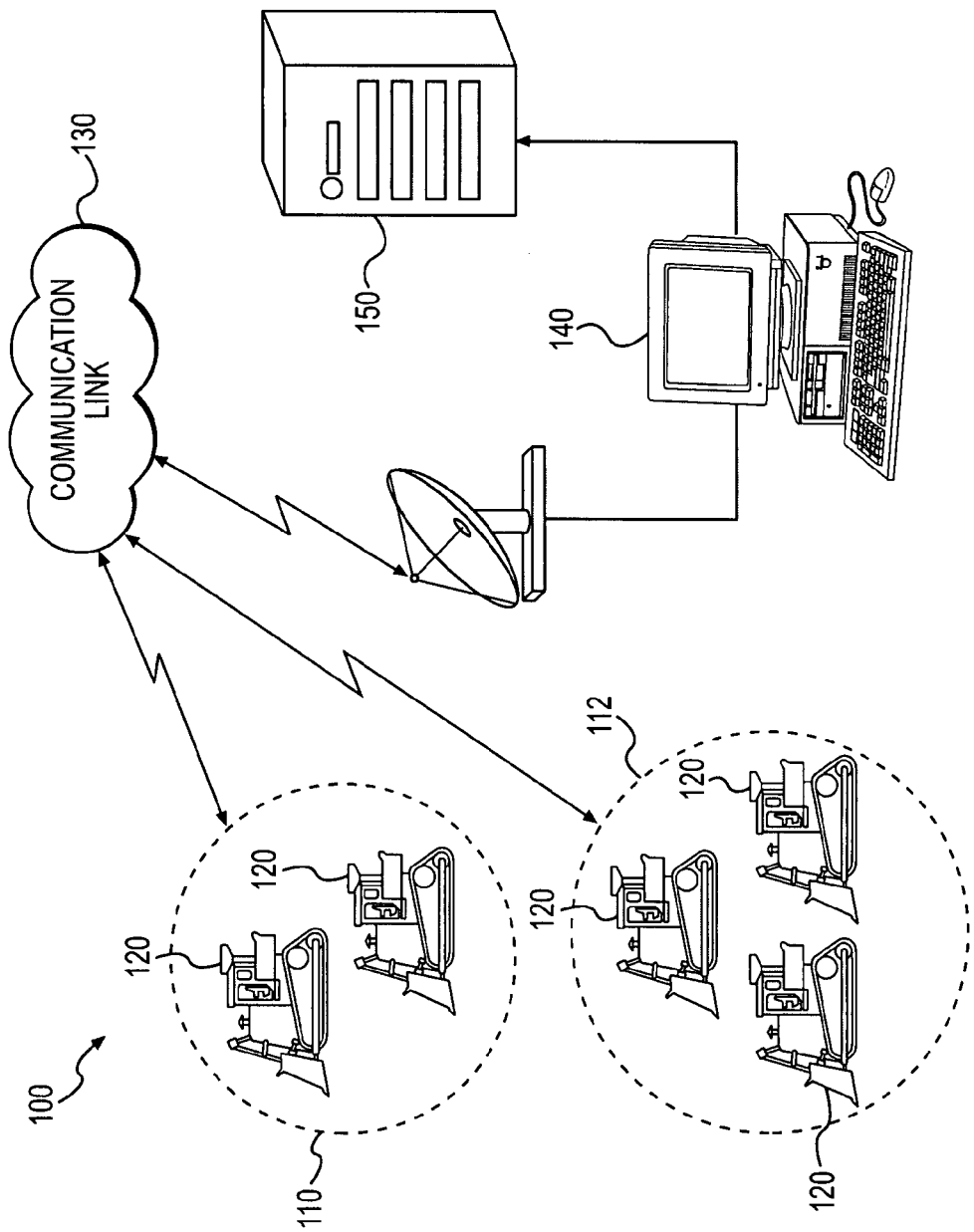
FIG. 1A illustrates an exemplary work environment consistent with certain disclosed embodiments.

FIG. 1A illustrates an exemplary work environment 100 in which processes and systems consistent with the disclosed embodiments may be implemented. Work environment 100 may include one or more components that that cooperate to perform a machine environment task associated with an industry such as mining, construction, transportation, agriculture, manufacturing, or any other type of industry. Work environment 100 may include one or more machines 120 coupled to a client system 140 and/or a data monitoring server 150 via one or more communication networks 130. Work environment 100 may be configured to monitor, collect, control, filter, and/or manage information associated with an operation of one or more machines 120 and distribute the information to one or more back-end systems, such as data monitoring server 150. It is contemplated that additional and/ or different components than those listed above may be included in work environment 100.

Machines 120 may each be a fixed or mobile machine configured to perform an operation associated with work environment 100. Thus, machine, as the term is used herein, refers to a fixed or mobile machine that performs some type of operation associated with a particular industry, such as mining, construction, farming, etc. and operates between or within project environments (e.g., construction site, mine site, power plants, etc.) Furthermore, machine 120 may be used to refer to any remote asset operating within or associated with work environment 100. A non-limiting example of a fixed machine includes an engine system operating in a plant, a material conveyer, or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. A machine may be driven by a combustion engine or an electric motor. The types of machines listed above are exemplary and not intended to be limiting. It is contemplated that work environment 100 may implement any type of machine. Accordingly, although FIG. 1A illustrates machines 120 as mobile earth-moving machines, each machine 120 may be any type of machine operable to perform a particular function within work environment 100. Furthermore, it is contemplated that machines 120 may include a first set of machines 110 and a second set of machines 112 for associating the operations of particular machines to groups of machines. Furthermore, it is also contemplated that first and second sets of machines may be located in separate work sites located remotely from each other, and with client system 140.

According to one embodiment, first set of machines 110 and second set of machines 120 may operate in separate job-site environments within work environment 100. In order to facilitate data communication between or among separate job-sites and a centralized back-end system, work environment 100 may employ a plurality of client systems 140, each client system acting as a data collection hub for a respective job site. Each client system may collect operation data from one or more machines operating within the designated geographical confines of the corresponding job-site. The operation data may be transferred to data monitoring server 150 using software and/or hardware devices that establish a direct and secure communication link between client systems 140 and data monitoring server 150.

Figure 1B:
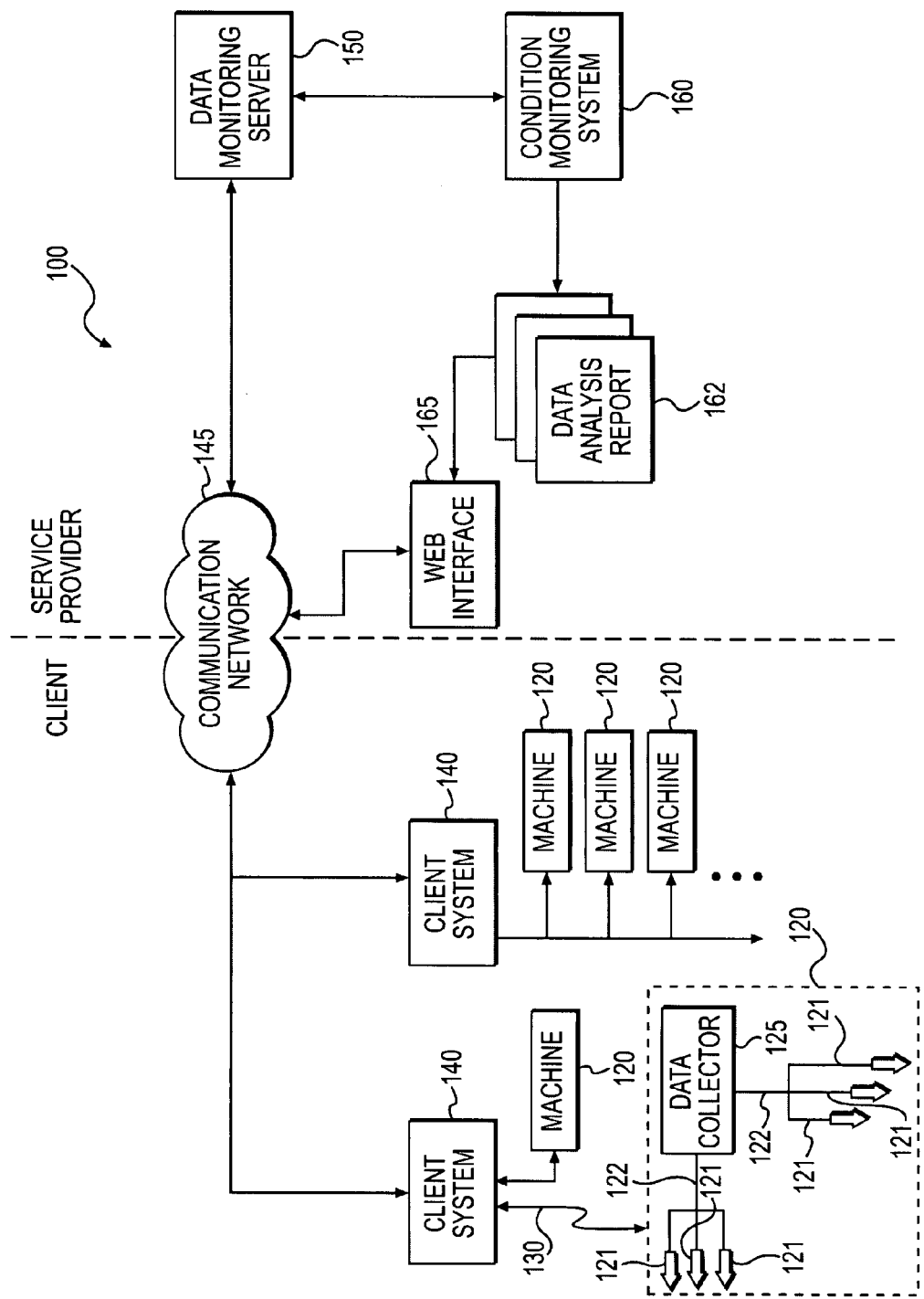
FIG. 1B provides a block diagram illustrating an exemplary network for facilitating remote machine data transfer in accordance with the disclosed embodiments.

Work environment 100 may embody a connected worksite that may integrate data collection capabilities of machines 120 with "real-time" or "near real-time" file transfer capabilities to distribute the collected data to one or more client systems 140 and/or data monitoring server 150. Furthermore, work environment 100 may employ a customizable file transfer platform that facilitates secure and direct data communication between machine 120, a client data collection system (e.g., client system 140), and third-party data monitoring servers 150. FIG. 1B illustrates a schematic diagram detailing certain component and features corresponding to work environment 100 of FIG. 1A. As illustrated in FIG. 1B, each machine 120 may include on-board data collection and communication equipment to monitor, collect, and/or transmit information associated with an operation of one or more components of machine 120. For example, machine 120 may include, among other things, one or more monitoring devices 121 (e.g., sensors, electronic control modules, etc.) coupled to one or more data collection devices 125 via communication lines 122. Each machine 120 may also be configured to receive information from off-board systems, such as a client system 140. The components described above are exemplary and not intended to be limiting. Accordingly, the disclosed embodiments contemplate each machine 120 including additional and/or different components than those listed above.

Data collector 125 may be operable to receive, collect, and/or package operation data associated with machine 120. Operation data, as the term is used herein, refers to any type of data indicative of at least one operational aspect associated with one or more machines 120 or any of its constituent components or subsystems. Non-limiting examples of operation data may include, for example, health information such as fuel level, oil pressure, engine temperate, coolant flow rate, coolant temperature, tire pressure, or any other data indicative of the health of one or more components or subsystems of machine 120. Alternatively and/or additionally, operation data may include status information such as engine power status (e.g., engine running, idle, off), engine hours, engine speed, machine speed, location, or any other data indicative of a status of machine 120. Optionally, operation data may also include certain productivity information such as, task progress information, load vs. capacity ratio, shift duration, haul statistics (weight, payload, etc.), fuel efficiency, or any other data indicative of a productivity of machine 120. Alternatively and/or additionally, operation data may include control signals for controlling one or more aspects or components of machine 120. Data collector 125 may receive/collect operational information associated with an operation of machine 120 from one or more monitoring devices 121 during the execution of an assigned task.

Data collector 125 may be configured to coordinate the transmission of operation data from the machine to one or more off-board systems, such as client system 140 or data monitoring server 150. To facilitate data communication, data collector 125 may include one or more communication modules. For example, data collector 125 may include a satellite communication module that may be adapted to facilitate communication between machine 120 and an off-board system (such as a client system 140 and/or data monitoring server 150) via a satellite communication network. The satellite communication module may be configured to operate using one or more satellite subscriber networks such as LEO or GeoSat services. Alternatively, the satellite communication module(s) may be configured to communicate with one or more public or governmental satellite services, such as GPS or Glonass. Alternatively and/or additionally, data collector 125 may include cellular communication modules that may be configured to facilitate wireless communication between machine 120 and an off-board system via one or more available cellular subscriber network(s). Data collector 125 may include a WiFi or WiMax communication module(s) that communicates data via a wireless local area network device. Alternately and/or additionally, data collector 125 may also include a point-to-point wireless communication module that communicates with other point-to-point equipped systems. Furthermore, satellite, cellular, WiFi, point-to-point, and/or other communication methods may all be supported by a single communication module, thereby limiting the amount of equipment required to support multiple communication methods. Data collector 125 may be adapted to support multiple communication methods or services such as satellite, cellular, short message service (SMS), text messaging, paging, or any other type of communication services suitable for remote communication of data in asset management environments.

Communication link 130 may include any network that provides two-way communication between machines 120 and an off-board system (e.g., client system 140, data monitoring server 150, etc.) For example, communication link 130 may communicatively couple machines 120 to client system 140 across a wireless networking platform such as, for example, a satellite communication system, a cellular communication system, or any other platform for communicating data with one or more geographically dispersed assets (e.g., Bluetooth, microwave, point-to-point wireless, point-to-multipoint wireless, multipoint-to-multipoint wireless.) Although communication link 130 is illustrated as satellite- and/or cellular-based wireless communication networks it is contemplated that communication link 130 may also include or embody wireline networks such as, for example, Ethernet, fiber optic, waveguide, or any other type of wired communication network. It is also contemplated that communication network may support additional communication media or communication methods such as smartcard technology, manual data transport methods, or any suitable means for transporting data between machine 120 and off-board systems.

Communication link 130 may also include any necessary infrastructure to support message routing and network operations. For example, communication link 130 may include various hardware and software support systems and equipment that facilitate operations of one or more communication services, such as subscriber-based satellite and cellular services.

Client system 140 may be configured to receive operation data associated with one or more machines 120. According to one embodiment, client system 140 may be a centralized computer system associated with a job-site of work environment 100 that may communicatively coupled to one or more data collectors 125 associated with one or more machines 120 operating within the job-site. Client system 140 may be adapted to detect one or more machines 120 operating within a particular job-site, establish a communication channel with machines 120, and offload operation data from one or more machines 120. Client system 140 may be configured to maintain a continuous communication channel with one or more machines 120. Alternatively, client system 140 may be adapted to periodically connect and download the operation data from one or more machines 120.

Client system 140 may be configured to distribute the operation data to data monitoring server 150, for further analysis. As illustrated in FIG. 1B, client system 140 may be communicatively coupled to data monitoring server 150 via communication network 145. Communication network 145 may include any type of network over which data may be communicated between client system 140 and data monitoring server 150. For example, communication network 145 may communicatively couple client system 140 to data monitoring server 150 across a wireless networking platform such as, for example, a satellite communication system. Alternatively and/or additionally, communication network 145 may include one or more other broadband communication platforms appropriate for communicatively coupling one or more client system 140 to data monitoring server 150 such as, for example, cellular, Bluetooth, microwave, point-to-point wireless, point-to-multipoint wireless, multipoint-to-multipoint wireless, or any other appropriate communication platform for networking a number of components. It is also contemplated that communication network 145 may include wireline networks such as, for example, Ethernet, fiber optic, waveguide, or any other type of wired communication network. According to one embodiment, communication network 145 may include any type of communication medium that allows client system 140 to communicate with data monitoring server 150 via a communication network, such as the Internet.

Data monitoring server 150 may embody a computer server adapted to receive, collect, filter, route, and/or manage data collected by one or more client systems 140. According to one embodiment, data monitoring server 150 may establish a secure, direct communication channel with one or more client systems 140 via the Internet of other available communication platform. As such, data monitoring server 150 may receive machine operation data files directly from client systems 140, without requiring the use of an intermediate file depository.

Condition monitoring system 160 may include any device or system configured to analyze operation data associated with machines 120 and/or one or more groups of machines 110, 112. For example, condition monitoring system 160 may embody a computer system including diagnostic software for analyzing the operation data associated with one or more machines 120 based on threshold levels (that may be factory set, manufacturer recommended, and/or user configured) associated with a respective machine.

Condition monitoring system 160 may generate customized data analysis reports 162 summarizing results of analysis performed on operation data. These reports may be provided to a client via a web interface 165 that allows a client to view current and past analysis reports associated with machines 120, set of machines 120, one or more job-sites, and/or work environment 100. These reports may embody interactive web pages that allow users to select, view, and customize the format of the reported data. For example, a repair technician assigned to maintain a particular type of machine may modify the report display format to include only those types of machines to which he is assigned.

Figure 2:
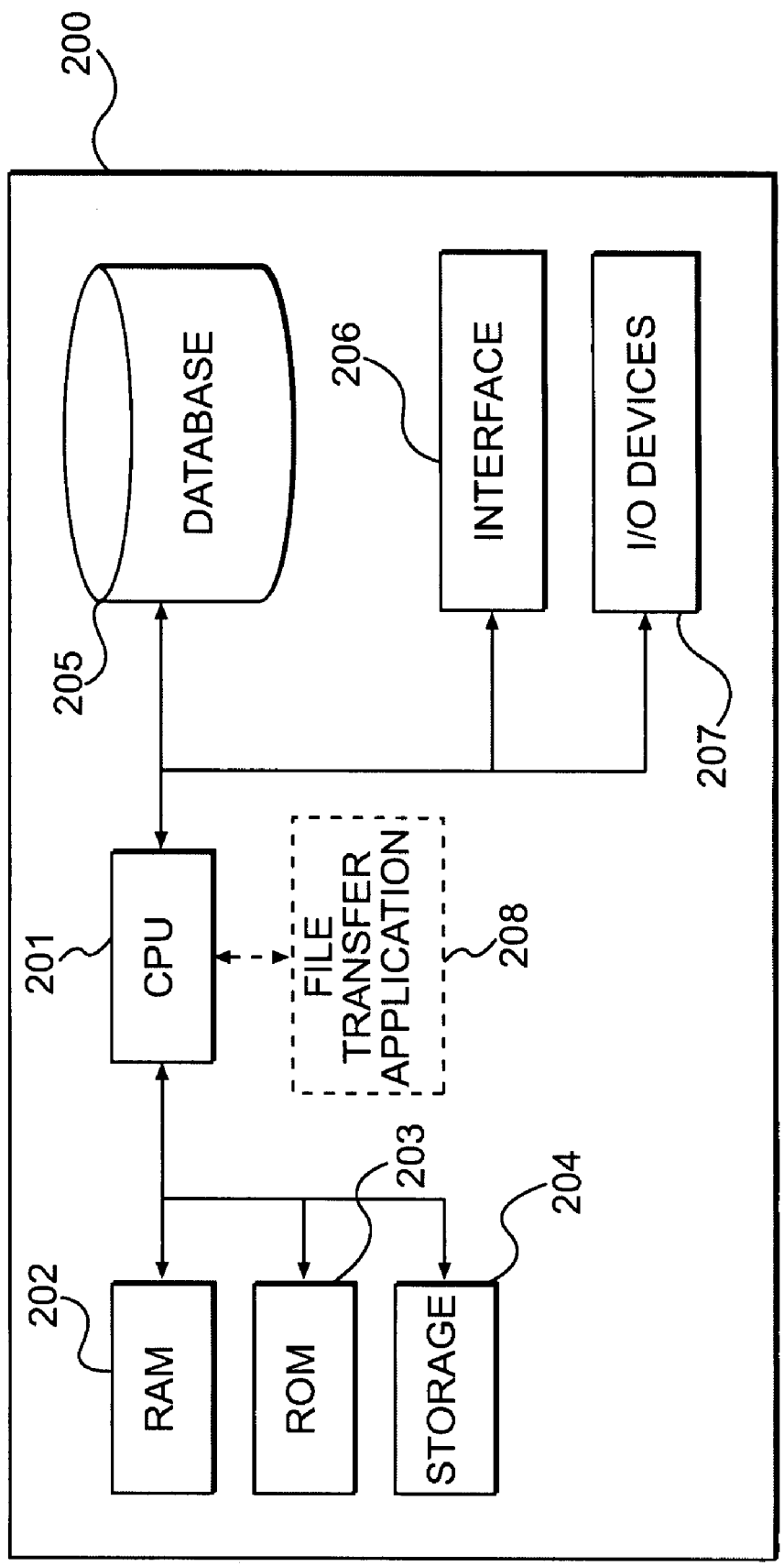
FIG. 2 provides a schematic illustrating an exemplary computer system, one which processes and methods consistent with the disclosed embodiments may be implemented.

Client system 140, data monitoring server 150, and condition monitoring system 160 may each embody processor-based computer systems, such as system 200 illustrated in FIG. 2. System 200 may include any type of processor-based system on which processes and methods consistent with the disclosed embodiments may be implemented. As illustrated in FIG. 2, system 200 may include one or more hardware and/or software components configured to execute software programs, such as software for collecting, distributing, and analyzing data collected from machines operating in work environment 100. For example, system 200 may include one or more hardware components such as, for example, a central processing unit (CPU) 201, a random access memory (RAM) module 202, a read-only memory (ROM) module 203, a storage 204, a database 205, an interface 206, and one or more input/output (I/O) devices 207. Alternatively and/or additionally, system 200 may include one or more software components such as, for example, a computer-readable medium including computer-executable instructions for performing methods consistent with certain disclosed embodiments. It is contemplated that one or more of the hardware components listed above may be implemented using software. For example, storage 204 may include a software partition associated with one or more other hardware components of system 200. System 200 may include additional, fewer, and/or different components than those listed above. It is understood that the components listed above are exemplary only and not intended to be limiting.

CPU 201 may include one or more processors, each configured to execute instructions and process data to perform one or more functions associated with system 200. As illustrated in FIG. 1, CPU 201 may be communicatively coupled to RAM 202, ROM 203, storage 204, database 205, interface 206, and I/O devices 207. CPU 201 may be configured to execute sequences of computer program instructions to perform various processes, which will be described in detail below. The computer program instructions may be loaded into RAM for execution by CPU 201.

RAM 202 and ROM 203 may each include one or more devices for storing information associated with an operation of system 200 and/or CPU 201. For example, ROM 203 may include a memory device configured to access and store information associated with system 200, including information for identifying, initializing, and monitoring the operation of one or more components and subsystems of system 200. RAM 202 may include a memory device for storing data associated with one or more operations of CPU 201. For example, ROM 203 may load instructions into RAM 202 for execution by CPU 201.

Storage 204 may include any type of mass storage device configured to store information that CPU 201 may need to perform processes consistent with the disclosed embodiments. For example, storage 204 may include one or more magnetic and/or optical disk devices, such as hard drives, CD-ROMs, DVD-ROMs, or any other type of mass media device.

Database 205 may include one or more software and/or hardware components that cooperate to store, organize, sort, filter, and/or arrange data used by system 200 and/or CPU 201. For example, database 205 associated with client system 140 and/or data monitoring server 150 may store historical operation data associated with a machine 120. This data may be accessible by CPU 201 associated with the condition monitoring system should, for example, a user request a historical report associated with operation data for a particular aspect of one or more machines. It is contemplated that database 205 may store additional and/or different information than that listed above.

Interface 206 may include one or more components configured to transmit and receive data via a communication network, such as the Internet, a local area network, a workstation peer-to-peer network, a direct link network, a wireless network, or any other suitable communication platform. For example, interface 206 may include one or more modulators, demodulators, multiplexers, demultiplexers, network communication devices, wireless devices, antennas, modems, and any other type of device configured to enable data communication via a communication network.

I/O devices 207 may include one or more components configured to communicate information with users associated with system 200. For example, I/O devices 207 may include a console with an integrated keyboard and mouse to allow users to input parameters associated with system 200. I/O devices 207 may also include a display including a graphical user interface (GUI) for outputting information on a monitor. I/O devices 207 may also include peripheral devices such as, for example, a printer for printing information associated with system 200, a user-accessible disk drive (e.g., a USB port, a floppy, CD-ROM, or DVD-ROM drive, etc.) that allows users to input data stored on a portable media device, a microphone, a speaker system, or any other suitable type of interface device.

File transfer application 208 may include software instructions for facilitating the transfer of data files between a remote system, such as client system 140, and a centralized back end-system, such as data monitoring server 150 and/or condition monitoring system 160. File transfer application 208 may include a client application (not shown). The client application may be loaded onto one or more client systems 140. The client application provides users with an interactive interface for defining file transfer specifications and data management settings of data monitoring server 150 associated with the respective client system 140.

Similarly, file transfer application 208 may include a server application (not shown). The server application may be loaded onto data monitoring server 150 and may be configured to collect file transfer specifications and data management settings from one or more client systems 140 and establish individual file transfer and data management settings for each client system in accordance with the collected specifications and settings. Accordingly, operations of data monitoring server 150 may be individually defined by users of a plurality of client systems 140. Operations of file transfer application 208, client system 140, and data monitoring server 150 will be described in detail below.

According to one embodiment, file transfer application 208 may be built upon a message oriented middleware communication protocol, such as IBM WebSphere® MQ software, that provides fast, efficient communication of messages from one message queue server to another (or between a message queue server and a message queue client). File transfer application 208 may provide a data communication system that capitalizes on the advantages of message oriented middleware (e.g., the "real-time" and "near real-time" data transfer capabilities associated with asynchronous systems) while neutralizing some of the deficiencies associated with message oriented middleware (e.g., incomplete or interrupted data transmissions).

Figure 3:
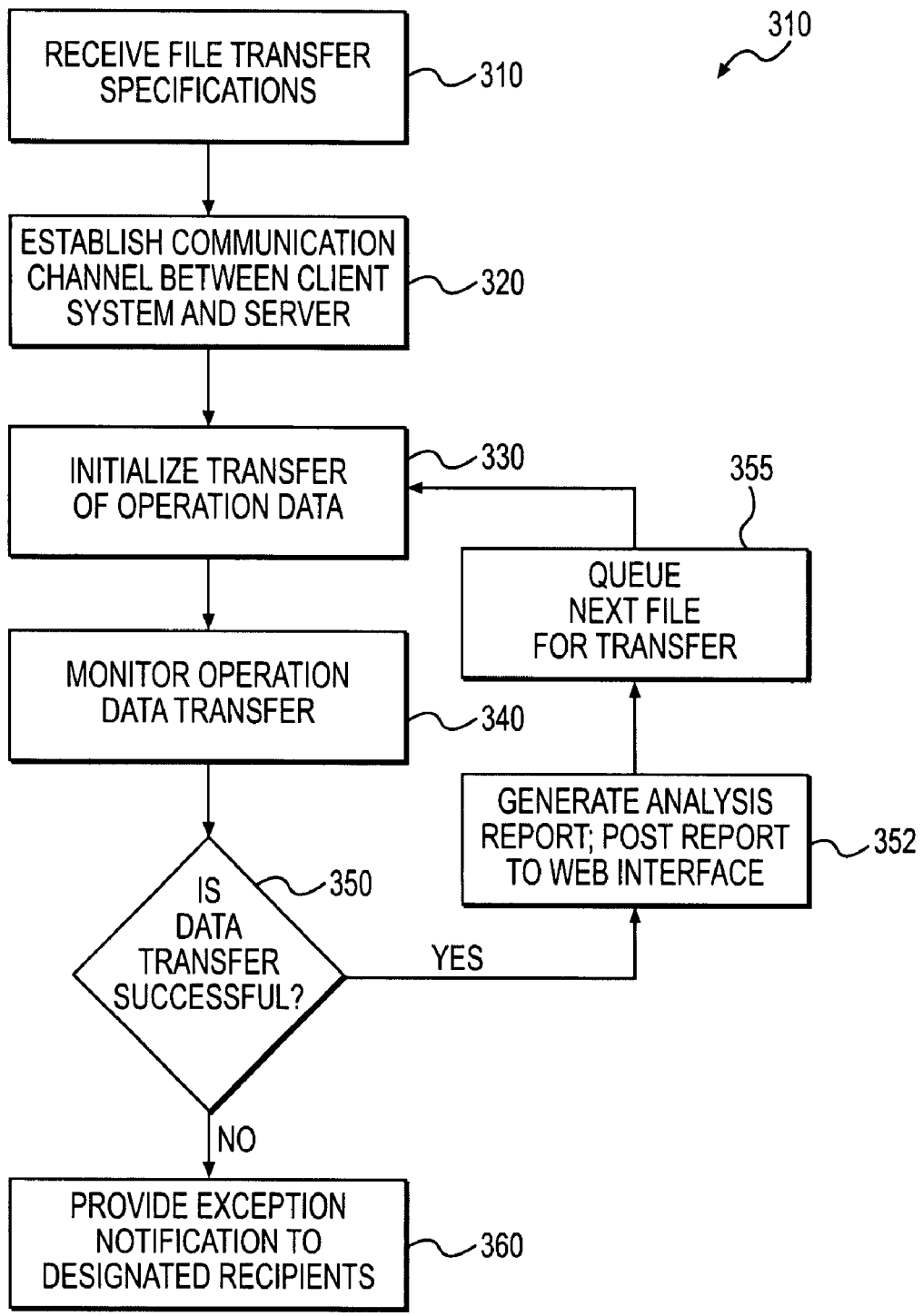
FIG. 3 provides a flowchart depicting an exemplary method for transferring data between a client system and a server.

Processes and methods consistent with the disclosed embodiments may facilitate secure and efficient transfer of data between remote systems and a back-end server by providing an automated method for monitoring and logging data transfer operations and notifying one or more designated recipients if the data transfer is inconsistent with user-defined file transfer specifications. Additionally, features and methods associated with the disclosed embodiments may be included as part of a condition monitoring system that monitors operation data associated with a plurality of remote assets operating in a work environment. As such, methods consistent with the disclosed embodiments may provide organizations that rely on "real-time" or "near real-time" data analysis and reporting with a system that monitors the transfer of data between remote data collection systems and back-end servers, detects exceptions to successful data transfer operations (i.e., data transfer failures, delays, etc.), and notifies designated personnel of the exceptions so that appropriate corrective measures can be taken. FIG. 3 provides a flowchart 300 depicting an exemplary method for transferring data between a client system 140 and a server 150 consistent with the disclosed embodiments.

As illustrated in FIG. 3, one or more file transfer specifications may be received from a user associated with one or more client systems 140 (Step 310). According to one embodiment, file transfer specifications may be defined by a user using a graphical interface associated with file transfer application 208 associated with client system 140. File transfer specifications may include customized instructions and/or definitions that, when uploaded into a data monitoring server 150, defines the manner in which file transfer is to be carried out with respect to a particular client system 140. File transfer specifications may include, for example, a file transfer source address, a network address of the server system, a file transfer destination server, a file transfer communication port, a file transfer destination folder address, a time limit that data can remain in a communication queue, a data storage time limit, one or more alert email recipient addresses, and/or a data communication schedule. The file transfer specifications noted above are exemplary only and not intended to be limiting. Accordingly, additional, fewer, and/or different file transfer specifications may be used to define file transfer capabilities between client system 140 and data monitoring server 150.

Once file transfer specifications have been received, a communication channel may be established between client system 140 and data monitoring server 150 (Step 320). According to one embodiment, file transfer application 208 may provide instructions for a client system 140 to establish a communication channel with data monitoring device 150 using a message queue service associated with the file transfer application 208. As such, client system 140 may locate data monitoring server 150 using a network address of the server specified in the file transfer specifications provided by the user. Accordingly, a communication channel may be established between a message queue of client system 140 and a message queue of the server system 150, for transferring data between the client and server systems.

According to one embodiment, a data transfer schedule may be established that defines a data transfer schedule between client system 140 and data monitoring server 150. Accordingly, client system 140 may establish a communication channel in accordance with the data transfer schedule. The data transfer schedule may be defined by a user as part of the file transfer specifications. By establishing a data transfer schedule, organization with limited access to bandwidth in remote areas may conserve network bandwidth by ensuring that client systems sharing the same network are not communicating data simultaneously.

Once the communication channel has been established between client system 140 and data monitoring server 150, client system 140 may initialize data transfer with data monitoring system 150 (Step 330). For example, client system 140 may identify operation data stored at a file transfer source address specified by the file transfer specifications. Client system 140 may load the data into the client message queue. The client message queue may begin transferring the data to the server message queue via the communication channel.

According to one embodiment, operation data may be received from one or more machines and stored in a file transfer source location by client system 140. Subsequently, a client message queue may locate the operation data in a file source location associated with the file transfer specifications defined by the user. Alternatively and/or additionally, file transfer application 208 may search client system and identify any "new" operation data that has been received since the last data transfer session. The client message queue may schedule the operation data for communication to the server message queue via the communication channel.

File transfer application 208 may monitor data transfer between client system 140 and data monitoring server 150 (Step 340) to determine whether each data file transfer is complete and in conformance with the file transfer specifications (Step 350). If the data transfer is successful (Step 350: Yes), file transfer application 208 may queue subsequent data files for transfer (Step 355). If, however, the data transfer is unsuccessful (Step 350: No), file transfer application may provide an exception notification to one or more designated recipients specified by the file transfer specifications.

According to one embodiment, file transfer application 208 may provide instructions that enable client system 140 to determine if the data file is successfully transmitted from the client system to the message queue of the server in conformance with the file transfer specifications. If the data is not transferred by client system 140, file transfer application 208 may provide an exception notification message to one or more designated recipients indicating a problem with the client communication capabilities. Exception notification message may include any type of electronic message such as, for example, an electronic message to a cellular or wireless device, an electronic mail message, a prerecorded voicemail message, a pop-up window associated with a desktop portion of file transfer application 208, or any other type of electronic message.

Similarly, file transfer application 208 may provide instructions that enable data monitoring server 150 to determine if the data file is successfully received from the client system. For example, data monitoring system 150 may analyze a received file, compare the received file to the file transmitted by client system 140, and determine if the received data is consistent with the transmitted data. If, for example, the data includes missing or incomplete information, file transfer application 208 may generate an exception notification message to the designated recipients indicating a problem with the server communication capabilities.

The file transfer processes described herein may be implemented in virtually any environment where "real-time" or "near real-time" analysis of data may be advantageous. According to one exemplary embodiment, the file transfer processes described herein may be implemented as part of a connected worksite environment that collects operation data associated with one or more machines, groups of machines, or work environment in a remote client systems; queues the operation data for transfer to one or more back-end systems, such as data monitoring server 150; monitors the transfer of data between the remote client system and the back-end system based on one or more file transfer specifications; and provides an exception notification to one or more designated users if the transfer of data is inconsistent with the file transfer specifications.

Figure 4:
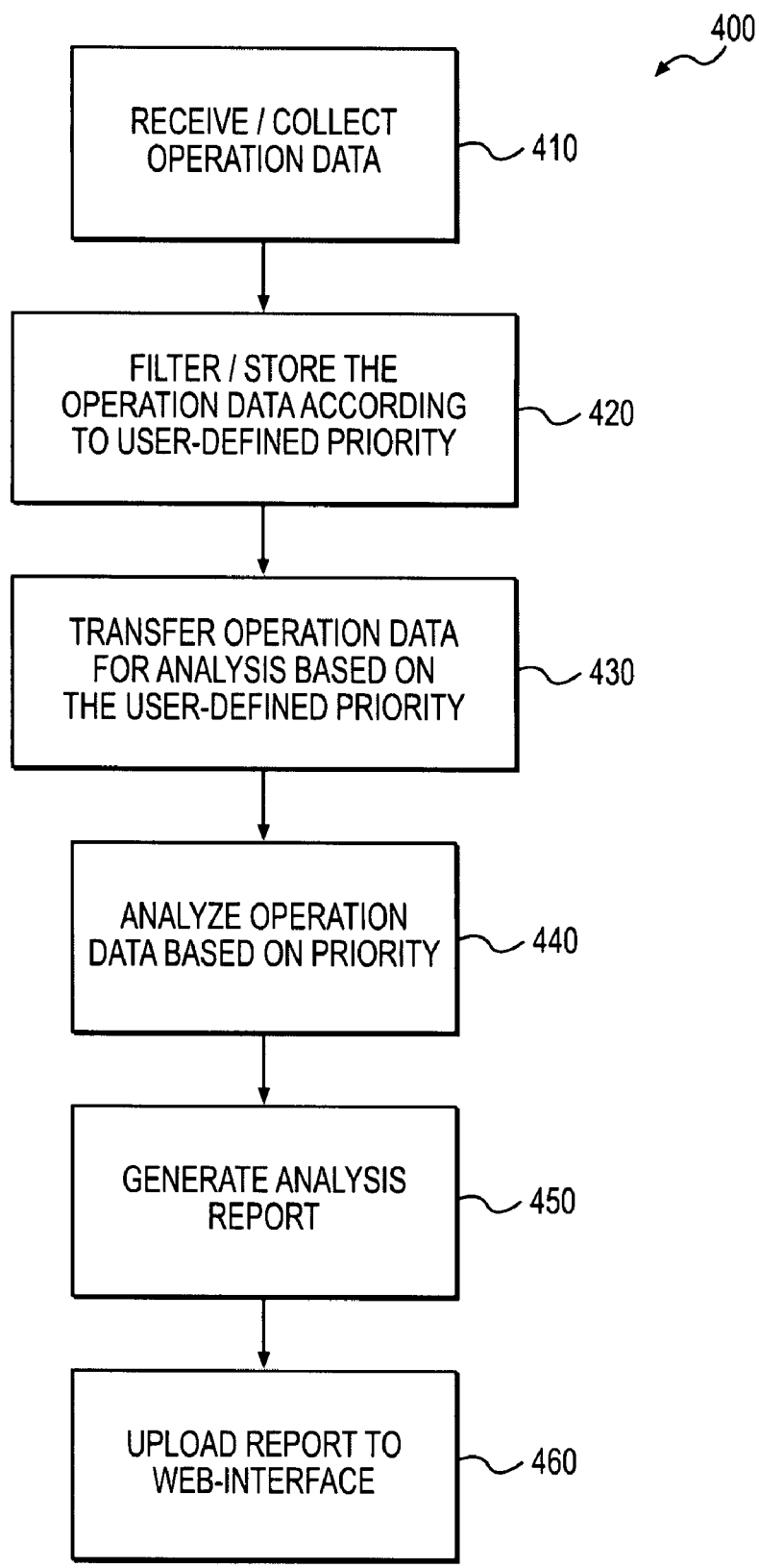
FIG. 4 provides a flowchart depicting an exemplary data transfer process that includes data management and filtering features consistent with the disclosed embodiments.

In addition to monitoring the transfer of data between one or more client systems 140 and data monitoring server 150, processes and methods described herein may provide a solution that allows users to define data management and handling capabilities associated with the file transfer process. For instance, the file transfer process described herein may be enhanced by allowing users to designate a priority level associated with one or more operational aspects. As such, file transfer application 208 may queue operation data for data transfer and analysis according to the designated priority of the operation data. Accordingly, data identified as high-priority may be queued for data transmission and analysis before data that is not designated as high-priority. FIG. 4 provides a flowchart 400 that illustrates an exemplary data transfer process that includes data management and filtering features consistent with the disclosed embodiments.

As illustrated in FIG. 4, the file transfer process may begin with the receipt/collection of operation data associated with one or more machines operating in a remote work environment (Step 410). For example, file transfer application 208 may be configured to receive operation data from one or more machines and/or groups of machines. According to one embodiment, operation data may be collected by one or more data monitoring devices 122 associated with each machine and loaded into the machine's data collector 125. Each data collector 125 may stream the operation data to a nearby client system 140, which is adapted to collect operation data from one or more machines operating in an associated geographical area.

Alternatively and/or additionally, operation data collected by one or more monitoring devices 121 may be temporarily stored in data collector 125 associated with each machine. Periodically, client system 140 may transmit a data request signal to each of data collectors 125 and receive the operation data stored in data collector 125, in response to the data request signal.

Once operation data has been received/collected by client system 140, the operation data may be filtered in accordance with a predefined priority (Step 420). According to one embodiment, the data management interface may allow users to establish a priority associated with one or more operational aspects. For instance, users may designate certain health information associated with machine (e.g., engine temperature, engine oil pressure, vital fluid levels, machine location, etc.) as high-priority data. Similarly, users may designate certain non-vital health data (e.g., productivity data such as machine load statistics, etc.) as low priority data.

Users may further specify certain data management and filtering actions to be taken by client system 140 and/or data monitoring server 150. For example, file transfer application may include a data management interface, whereby users may designate the manner in which the operation data is handled by client system 140 and/or data monitoring server 150. According to one embodiment, users may designate different file storage locations for high-priority data and low-priority data. Accordingly, users may define separate file transfer specifications for each file storage location such that the high-priority operation data is transferred prior to and/or with greater frequency than low-priority data. Similarly, data monitoring server 150 may identify and filter high-priority data from among other operation data and queue the high-priority data for condition monitoring analysis and reporting with greater urgency than low-priority data.

Once data management specifications have been established, operation data files may be transferred between client system 140 and data monitoring server 150 according to the user-defined priority (Step 430), in accordance with the file transfer methods described herein. Data monitoring server 150 may manage the received operation data in accordance with the data management settings defined by the user. For instance, data monitoring system may immediately queue high-priority operation data for analysis by condition monitoring system 160 (Step 440), while storing low-priority operation data in a destination file specified by the user for future analysis (e.g., after high-priority operation data has been analysis and/or according to a user-defined schedule.)

Condition monitoring system 160 may generate a report that summarizes the operation data analysis (Step 450). For high-priority data, these reports may be automatically generated as soon as the analysis is complete. In contrast, low-priority data reporting may be performed at scheduled intervals according to the data management specifications provided by the user. Once complete, the analysis report may be posted and/or uploaded to a web-interface (Step 460) that allows user to access, customize, download, and/or print the analysis reports.

By implementing the file transfer processes illustrated in FIG. 3 in the connected work environment of FIG. 1A, organizations that rely on fast, efficient, and reliable transfer of large amounts of raw data may become more efficient. Specifically, the file transfer processes no longer require sender and recipients to continuously monitor file transfers to confirm that data has been sent and received successfully. Furthermore, by implementing the file transfer method of FIG. 4, which allows users to customize the data management and data handling features of a condition monitoring system, organizations may further customize file transfer and condition monitoring processes to optimize the use of communication resources available to one or more client systems 140. Accordingly, should one client system be located in an area where communication service is significantly limited, the file transfer process may be adapted to dedicate file transfer resources to communicating only operation data designated as high-priority.

INDUSTRIAL APPLICABILITY

Methods and systems consistent with the disclosed embodiments may provide a file transfer process that facilitates the direct transfer of data between a remote client system and a back-end server, while identifying any exceptions to the successful transfer of machine data in accordance with user-defined file transfer specifications. Work environments that employ processes and features consistent with the disclosed embodiments provide an automated system for monitoring file transfer sessions and automatically notifying user-designated personnel of problems with the file transfer, thereby limiting the amount of oversight required to ensure that data files are sent successfully and in a timely manner.

Although the disclosed embodiments are described in connection with a file transfer process associated with machine work environments, they may be applicable to any environment where it may be advantageous to monitor file transfer processes and notify support personnel of potential problems with file transfer capabilities. According to one embodiment, the presently disclosed file transfer process may be included as part of a remote asset monitoring system to ensure the timely transfer of data from a remote work-site to a condition monitoring system that analyzes the health, status, and/or productivity of the remote assets.

The presently disclosed file transfer process may have several advantages. For example, because the file transfer process described herein provides a solution that automatically notifies designated personnel upon detection of a problem with a data transfer session, support personnel may be able to identify and resolve data transfer problems soon after detection. Furthermore, these automated processes may limit the need for senders and intended recipients to manually monitor whether a file transfer was successful. As a result, organizations that rely on "real-time" or "near real-time" collection and analysis or work environment data may become more efficient.

In addition, the presently disclosed file transfer process may have certain cost advantages, when employed in conjunction with a machine condition monitoring systems. For instance, by providing a file transfer process that facilitates and maintains "real-time" and "near real-time" data acquisition, potential health problems associated with one or more machines may be identified, analyzed, and resolved soon after detection, thereby preventing more costly and serious damage if the problem were allowed to persist.

It will be apparent to those skilled in the art that various modifications and variations can be made to the disclosed system and method for remote machine data transfer without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for data transfer between a client system and a server system comprising:
   receiving, at a client system communicatively coupled to a machine, operation data associated with the machine, wherein the operation data comprises at least one aspect of a mechanical operation of the machine;
   receiving, at a data transfer application associated with the client system, one or more user-defined file transfer specifications;
   establishing, by the client system, a communication channel between the client system and a server system based on the file transfer specifications;
   initializing, by the data transfer application, transfer of operation data between the client system and the server system via the communication channel, wherein initializing the transfer of operation data includes:
      queuing the operation data for transfer according to a user-defined priority level associated with the at least one aspect of a mechanical operation of the machine; and
      initiating transfer of the operation data in accordance with the user-defined priority level; and
   providing an exception notification to one or more user-designated recipients if the transfer of the operation data between the client system and the server system is inconsistent with the file transfer specifications.

2. The computer-implemented method of claim 1, wherein the one or more file transfer specifications include one or more of a file transfer source address, a network address of the server system, a file transfer destination server, a file transfer communication port, a file transfer destination folder address, a time limit that data can remain in a communication queue, a data storage time limit, one or more alert email recipient addresses, or a data communication schedule.

3. The computer-implemented method of claim 2, further including:
   queuing the operation data in accordance with the file transfer specifications.

4. The computer-implemented method of claim 3, further including:
   receiving the operation data from the client system;
   filter the operation data according to the user-defined priority; and
   queue the operation data for analysis based on the user-defined priority.

5. The computer-implemented system of claim 1, wherein providing the notification includes:
   monitoring the transfer of operation data between the client system and the server system; and
   detecting one or more of a failure of the client system to transmit the operation data or a failure of the server system to receive the operation data.

6. The computer-implemented method of claim 5, wherein providing the notification to one or more user-designated recipients includes:
   automatically generating an electronic mail message upon detection of the failure; and
   sending the electronic mail message to the one or more user-designated recipients.

7. A computer-readable medium for use on a computer system, the computer-readable medium having computer-executable instructions for performing the computer-implemented method of claim 1.

8. A system for remote machine data transfer comprising:
   a client system communicatively coupled to one or more machines operating in a work environment and configured to receive operation data associated with the one or more machines, wherein the operation data comprises at least one aspect of a mechanical operation of the one or more machines;
   a data transfer application for facilitating communication between the client system and a server system communicatively coupled to the client system, the data transfer application configured to:
      receive one or more user-defined file transfer specifications;
      establish a communication channel between the client system and the server system based on the file transfer specifications;
      initialize transfer of operation data between the client system and the server system via the communication channel, wherein initializing the transfer of operation data includes:
         queuing the operation data for transfer according to a user-defined priority level associated with the at least one aspect of a mechanical operation of the one or more machines; and
         initiating transfer of the operation data in accordance with the user-defined priority level; and provide a notification to one or more user-designated recipients if the transfer of operation data between the client system and the server system is unsuccessful.

9. The system of claim 8, wherein the one or more file transfer specifications include one or more of a file transfer source address, a network address of the server system, a file transfer destination server, a file transfer communication port, a file transfer destination folder address, a time limit that data can remain in a communication queue, a data storage time limit, one or more alert email recipient addresses, or a data communication schedule.

10. The system of claim 8, wherein the client system includes a data collection module communicatively coupled to one or more data monitoring devices associated with a machine, the data collection module being configured to:
receive operation data associated with the machine from the one or more data monitoring devices; and
transmit the operation data to the server system.

11. The system of claim 10, wherein the data collection module includes an electronic control module associated with the one or more machines.

12. The system of claim 8, wherein the client system includes a computer system communicatively coupled to at least one data collection module associated with one or more machines operating in the work environment and configured to receive operation data associated with the one or more machines from the at least one data collection module.

13. The system of claim 8, wherein providing the notification includes:
monitoring the transfer of operation data between the client system and the server system; and
detecting one or more of a failure of the client system to transmit the operation data or a failure of the server system to receive the operation data.

14. The system of claim 13, wherein providing the notification to one or more user-designated recipients includes:
automatically generating an electronic mail message upon detection of the failure; and
sending the electronic mail message to the one or more user-designated recipients.

15. The system of claim 8, wherein the data transfer application includes a file management module configured to:
receive the operation data from the client system;
filter the operation data according to the user-defined priority; and
queue the operation data for analysis based on the user-defined priority.

16. The system of claim 15, further including a condition monitoring system configured to:
receive the operation data from the file management module;
analyze the operation data; and
generate a condition monitoring report based on the analysis of the operation data.

17. The system of claim 8, wherein the data transfer application may be associated with a message oriented middleware software application.

18. A system for remote machine data transfer comprising:
a machine including at least one monitoring device communicatively coupled to at least one component of the machine, the monitoring device configured to monitor operation data associated with the machine;
a client system in data communication with the machine and configured to collect operation data from the at least one monitoring device; and
a data transfer application for facilitating communication between the client system and a server system communicatively coupled to the client system, the data transfer application configured to:
receive one or more user-defined file transfer specifications;
establish a communication channel between the client system and the server system based on the file transfer specifications;
initialize transfer of operation data between the client system and the server system via the communication channel, wherein initializing the transfer of operation data includes:
queuing the operation data for transfer according to a user-defined priority level associated with the at least one aspect of a mechanical operation of the one or more machines; and
initiating transfer of the operation data in accordance with the user-defined priority level; and
provide a notification to one or more user-designated recipients if the transfer of operation data between the client system and the server system is unsuccessful.

19. The system of claim 18, wherein the one or more file transfer specifications include one or more of a file transfer source address, a network address of the server system, a file transfer destination server, a file transfer communication port, a file transfer destination folder address, a time limit that data can remain in a communication queue, a data storage time limit, one or more alert email recipient addresses, or a data communication schedule.

20. The system of claim 18, wherein the data transfer application is further configured to:
monitor the transfer of operation data between the client system and the server system; and
detect one or more of a failure of the client system to transmit the operation data or a failure of the server system to receive the operation data.

21. The system of claim 20, wherein providing a notification to one or more user-designated recipients includes:
automatically generating an electronic mail message upon detection of the failure; and
sending the electronic mail message to the one or more user-designated recipients.

* * * * *